United States Patent Office 2,962,453
Patented Nov. 29, 1960

2,962,453
POLYMERIZABLE COMPOSITIONS AND RESINS MADE THEREFROM

Benjamin Phillips, Charleston, and Charles W. McGary, Jr., and Charles T. Patrick, Jr., South Charleston, W. Va., assignors to Union Carbide Corporation, a corporation of New York No Drawing. Filed July 31, 1957, Ser. No. 675,252

6 Claims. (Cl. 260—2)

This invention relates to epoxide compositions and, more particularly, to polymerizable diepoxide compositions and resins made therefrom. It is directed to polymerizable diepoxide compositions comprising dicyclopentadiene dioxide, resins prepared therefrom and to methods for their preparation.

Our resins are water-resistant solids and can be made as hard, tough, infusible products which are insoluble in most organic solvents or they can be made as low melting, fusible solids which then can be hardened with various hardeners to form hard, tough, infusible products. Our infusible resins can be machined to desired shapes or configurations and can be polished to provide appealing finishes.

Our polymerizable compositions are room temperature solids which can be polymerized by maintaining the composition at an elevated temperature. They are particularly valuable as molding powders and as laminating powders for such applications as pre-loaded glass cloth. The pre-loaded glass cloth may then be laminated in the usual manner to produce glass laminates. By elevating the temperature of our compositions, low viscosity, polymerizable, liquid compositions are obtained. These liquid compositions have pot-lives of sufficient duration to permit the addition of fillers and pigments to alter the physical characteristics and appearances, respectively, of our resins. With or without fillers and pigments, the liquid compositions are readily pourable and capable of flowing into intricate corners of molds so that accurately molded articles result. These liquid compositions can be flowed, sprayed or spread on surfaces and cured to provide durable protective finishes thereto. Our polymerizable compositions are also soluble in many organic solvents such as acetone, methyl isobutyl ketone, ethyl acetate, butyl acetate, toluene, xylene and the like. Solutions thus formed can be flowed, sprayed or spread upon surfaces, the solvent driven off and the composition cured to provide durable coatings.

The polymerizable compositions of this invention can be advantageously made by mixing dicyclopentadiene dioxide with a catalyst from the class of mineral acids, metal halide Lewis acids and bases. Dicyclopentadiene dioxide is a crystalline solid which melts at about 184° C. and can be dissolved by many organic solvents at temperatures well below its melting point. Our compositions advantageously contain from 0.05 to 20 weight percent, preferably 0.1 to 12 weight percent, of catalyst based on the weight of dicyclopentadiene dioxide. The compositions can be prepared in any suitable manner as by mechanically mixing the liquid or granular forms of dicyclopentadiene dioxide with the liquid or granular forms of the catalyst. It is preferred to form a homogeneous mixture of dicyclopentadiene dioxide and catalyst prior to curing. This can be advantageously accomplished by first raising dicyclopentadiene dioxide to its melting point and then adding the catalyst alone or in solution to the melt with stirring. The solution thus formed may be cured immediately or cooled to room temperature and stored for future use, as desired. Granular or powdered dicyclopentadiene dioxide can be used also, in which event, the catalyst can be mechanically mixed with the granular or powdered dicyclopentadiene dioxide.

Curing can be carried out by maintaining the polymerizable compositions at temperatures in the range of from 100° C. to 400° C. The time required for effecting a complete cure can be made to vary from a few hours to several hours depending upon the curing temperature. A high curing temperature provides resins in less time than a low curing temperature. It is advantageous to heat the polymerizable compositions at a temperature in the range of from 50° C. to 250° C. to first effect a partial cure. A temperature from 150° C. to 400° C. then can be used to complete the cure. However, any one or combination of two or more temperatures within the above-specified range of 100° C. to 400° C. can be used.

While not wishing to be restricted to any particular theory or mechanics of reaction, it is believed that the polymerization reaction involves etherification through epoxy groups,

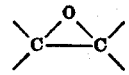

to form ether bonds linking and/or cross-linking the monomeric molecules. For example, our polymers can be illustrated as homopolymers containing repeating interconnected units represented by the formula:

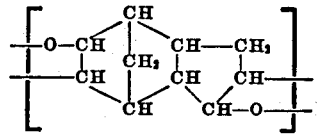

Catalysts which can be employed with advantageous effects in producing our resins are the ionic catalysts including strong alkalis, mineral acids and metal halide Lewis acids. Typical strong alkalis include the alkali metal hydroxides, e.g., sodium hydroxide and potassium hydroxide, and quaternary ammonium compounds, e.g., benzyltrimethylammonium hydroxide, tetramethylammonium hydroxide and the like. Representative mineral acids which can be used as catalysts include sulfuric acid, phosphoric acid, perchloric acid, polyphosphoric acid and the various sulfonic acids, such as, toluene sulfonic acid, benzene sulfonic acid and the like. Metal halide Lewis acids which are effective in producing our resins include borontrifluoride, stannic chloride, zinc chloride, aluminum chloride, ferric chloride and the like. The metal halide Lewis acid catalysts can also be used in the form of such complexes as etherate complexes and amine complexes, for example, borontrifluoride-piperidine and borontrifluoride-monoethylamine complexes. In the form of a complex, the metal halide Lewis acid catalyst is believed to remain substantially inactive until released as by dissociation of the complex upon increasing the temperature. When released from the complex, the catalyst then exerts its catalytic effect.

Uniform dispersion of catalyst in dicyclopentadiene dioxide prior to curing has been found to be desirable in order to obtain homogeneous resins and to avoid localized curing around catalyst particles. Agitation of our compositions containing dicyclopentadiene dioxide and catalyst is adequate when the catalyst is miscible with dicyclopentadiene dioxide. When the catalyst is immiscible in dicyclopentadiene dioxide, it can be added as a solution in a suitable solvent. Typical solvents for the acidic and basic catalysts include organic ethers, e.g., diethyl ether, dipropyl ether, 2-methoxy-1-propanol, organic esters, e.g., methyl acetate, ethyl acetate, ethyl propionate, organic ketones, e.g., acetone, methylisobutylketone, cyclohexanone, organic alcohols, e.g., methanol, cyclohexanol, propylene glycol and the like. The mineral acids and strong bases can be employed as solutions in water, whereas metal halide Lewis acid catalysts tend to decompose in water and aqueous solutions of such Lewis acids are not preferred.

Useful resins can be obtained, also, by the reaction of dicyclopentadiene dioxide with polyfunctional materials which contain at least two groups capable of reacting with epoxy groups. Such polyfunctional materials include polycarboxylic acids, polycarboxylic acid anhydrides, polyhydric alcohols and phenols, polyamines, polyamides, polyimines, polyimides, polythiols, and other epoxides and polyepoxides and the like.

Dicyclopentadiene dioxide is a solid diepoxide having a melting point of about 184° C. This diepoxide can be characterized by the formula:

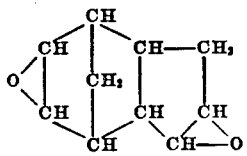

The diepoxide can be prepared by the epoxidation of the olefinic double bonds of dicyclopentadiene employing a suitable epoxidizing agent. Epoxidizing agents which are suitable for the epoxidation of dicyclopentadiene include the organic peracids, such as peracetic acid, and the aldehyde monoperacylates, such as, acetaldehyde monoperacetate. The epoxidation can be advantageously carried out by charging dicyclopentadiene to a reaction vessel and then gradually adding the epoxidizing agent. In order to provide ease of handling and to avoid formation of highly concentrated or crystalline epoxidizing agent with its possible explosion hazards, the epoxidizing agent is preferably employed as a solution.

As solvents for the epoxidizing agents, acetone, chloroform, methylethylketone, ethyl acetate, butyl acetate, and the like are representative. The reaction can be carried out at a temperature within the range of about −25° C. to 150° C., although higher and lower temperatures may be used. However, longer reaction times are needed at the lower temperature to produce high yields. At the higher temperatures, side reactions form undesirable materials which can be removed, however, by suitable purification procedures, such as, fractional distillation. The reaction can be continued until an analysis for epoxidizing agent indicates that an amount at least sufficient to epoxidize all the double bonds of the dicyclopentadiene has been consumed. In this connection it is desirable to employ an excess over the theoretical amount of epoxidizing agent to assure complete epoxidation. Upon discontinuance of the reaction, by-products, solvent and unreacted materials can be removed by any convenient procedure, such as, by adding a potboiler, for example, ethylbenzene, and stripping the low-boiling materials. A solid material, identified as dicyclopentadiene dioxide is obtained.

*Example 1*

A mixture prepared from 100 parts of dicyclopentadiene dioxide and 1 part of borontrifluoride-piperidine complex was maintained at a temperature of 180° C. The mixture was then raised to a temperature of 200° C. and held thereat for 2.5 hours. A hard resin was obtained.

*Example 2*

A mixture was prepared from 100 parts of dicyclopentadiene dioxide and 0.25 part of stannic chloride as a 12.5 weight percent solution in ethyl acetate. This mixture was heated to 180° C. and held thereat for 3 hours. The mixture then was raised to 200° C. and held thereat for 2.5 hours. A hard resin was obtained.

*Examples 3 through 5*

Three mixtures, each containing 100 parts of dicyclopentadiene dioxide and, respectively, 12.5 and 5 parts of borontrifluoride-1,6-hexanediamine complex catalyst were prepared. These mixtures were raised to a temperature of 200° C. and held there for 6 hours. Hard resins were obtained from each mixture.

*Examples 6 through 8*

Three mixtures, each containing 100 parts of dicyclopentadiene dioxide and, respectively, 0.1, 0.3 and 0.6 part of sulfuric acid as dilute solutions in water were prepared. The first of these mixtures was heated at 180° C. for 3 hours and then at 200° C. for 2.5 hours. A gel was formed from the first mixture in the first five hours of heating. The second and third mixtures were heated at 200° C. for 6 hours. A gel formed from the second mixture after 1.5 hours of heating and a gel formed from the third mixture after 1 hour of heating. Hard resins were obtained from each mixture.

*Examples 9 through 11*

Three mixtures, each containing 100 parts of dicyclopentadiene dioxide and, respectively, 1.0, 2.0 and 4.0 parts of potassium hydroxide as a 17.2 weight percent solution in ethylene glycol were prepared. The first mixture was heated at 180° C. for 3 hours and then at 200° C. for 2.5 hours. The second and third mixtures were each heated at 200° C. for a total of 6 hours. A hard resin was obtained from each mixture.

*Example 12*

A solution was prepared from 10 parts of dicyclopentadiene dioxide and 10 parts of ethyl acetate. Five parts of a solution containing about 0.08 part of borontrifluoride-etherate complex catalyst in ethyl acetate were added to the first solution. The resulting solution was heated on a steam bath for 30 minutes at atmospheric pressure after which time three drops of borontrifluoride-etherate complex catalyst was added. The solvent, ethyl acetate, was fractionated from the solution leaving a residual, resinous material which was heated at 160° C. for 6 hours. A hard resin, melting at about 75° C. was obtained.

*Example 13*

A mixture was prepared from 500 parts of the resin prepared in Example 12, 100 parts of maleic anhydride and 1 part of potassium hydroxide as a 5 percent solution in ethylene glycol. The mixture was heated until it became homogeneous, occurring at about 50° C. and then maintained at 120° C. for 1.5 hours. A gel was obtained after 0.5 hour of heating at 120° C. The gel temperature was raised to 160° C. and held there for 6 hours. A hard resin was obtained.

*Example 14*

A mixture was prepared from 82 parts of dicyclopentadiene dioxide, 32 parts of glycerol and 10 parts of borontrifluoride-piperidine complex. This mixture contained such amounts of glycerol and diepoxide as provided 1 hydroxyl group for each epoxy group. The amount of borontrifluoride-piperidine complex represented a catalyst concentration of about 5 percent borontrifluoride based on the weight of dioxide. The mixture was treated to 160° C. and held there for 6 hours. A hard resin was obtained.

*Example 15*

A 23.1 weight percent solution (1085 grams) of peracetic acid in ethyl acetate was added dropwise with stirring to 198 grams of dicyclopentadiene at 40° C. During the 1⅔ hours required for the addition the temperature was maintained at 40° C. by cooling when necessary. After an additional 4-hour reaction period an analysis for peracetic acid indicated that the reaction was completed. The reaction mixture was diluted with 1 liter of ethylbenzene and the ethyl acetate, acetic acid, and part of the ethylbenzene were removed on a still column under reduced pressure. After removal of all of the acetic acid the product solution in ethylbenzene was cooled to —10° C. The crystalline dicyclopentadiene dioxide was removed by filtration. A 123 gram yield of dicyclopentadiene dioxide having a melting point of 183° C. to 185° C. was obtained. By reducing the filtrate volume two additional cuts of crystalline product were obtained totaling 95 grams and having a melting point range of 178° C. to 181° C. The yield, based on the dicyclopentadiene charged, was 88.7 percent of the theoretical.

What is claimed is:

1. A curable composition comprising dicyclopentadiene dioxide and borontrifluoride in an amount from 0.1 to 12 weight percent based on the weight of dicyclopentadiene dioxide.
2. A curable composition comprising dicyclopentadiene dioxide and stannic chloride in an amount from 0.1 to 12 weight percent based on the weight of dicyclopentadiene dioxide.
3. A curable composition comprising dicyclopentadiene dioxide and sulfuric acid in an amount from .01 to 12 weight percent based on the weight of dicyclopentadiene dioxide.
4. A curable composition comprising dicyclopentadiene dioxide and potassium hydroxide in an amount from 0.1 to 12 weight percent based on the weight of dicyclopentadiene dioxide.
5. A homopolymer of dicyclopentadiene dioxide.
6. A curable composition comprising dicyclopentadiene dioxide and from about 0.05 to 20 weight percent, based on the weight of said dicyclopentadiene dioxide, of a catalyst selected from the group consisting of sulfuric acid, phosphoric acid, perchloric acid, polyphosphoric acid, aromatic sulfonic acid, boron trifluoride, stannic chloride, zinc chloride, aluminum chloride, ferric chloride, boron trifluoride-amine complex, boron trifluoride-etherate complex, benzyltrimethylammonium hydroxide, and tetramethylammonium hydroxide.

References Cited in the file of this patent
UNITED STATES PATENTS 2,739,161   Carlson _____ March 20, 1956

FOREIGN PATENTS 187,900   Austria _____ Dec. 10, 1956

OTHER REFERENCES

Grant: "Hackh's Chem. Dictionary," 3rd ed. (1944), p. 270.